United States Patent

[11] 3,587,326

| [72] | Inventors | Hugh E. Riordan<br>Wyckoff; N.J.<br>Bernard Parker, Teaneck, N.J.; Leon<br>Weisbord, New York, N.Y. |
|---|---|---|
| [21] | Appl. No. | 723,767 |
| [22] | Filed | Apr. 24, 1968 |
| [45] | Patented | June 28, 1971 |
| [73] | Assignee | Singer- General Precision,<br>Inc., Little Falls, N.J. |

[54] ACCELERATION SENSING APPARATUS
11 Claims, 1 Drawing Fig.

[52] U.S. Cl. ............................................ 73/492, 73/516
[51] Int. Cl. ........................................ G01p 15/04, G01p 15/08
[50] Field of Search ................................ 73/515, 516, 492; 200/61.47, 61.45, 152.7; 73/71, 71.2

[56] References Cited
UNITED STATES PATENTS

| 2,603,726 | 7/1952 | McLean | 73/503X |
| 3,023,612 | 3/1962 | Elder | 73/71.2 |
| 3,046,793 | 7/1962 | Riordan | 73/515 |
| 3,317,760 | 5/1967 | Coleman et al. | 73/516X |
| 3,462,998 | 8/1969 | Elder | 73/516X |

*Primary Examiner*—James J. Gill
*Attorneys*—S. A. Giarratana, K. A. Ohralik and G. B. Oujevolk ABSTRACT: An apparatus for detecting maximum accelerations and including a pair of adjacent chambers and a tube in communication with one of the chambers which is initially filled with a substantially incompressible fluid. A proof mass is disposed in the other of the chambers and may be latched there. In the unlatched condition, the proof mass responds to accelerations to project into the one chamber. Such projection forces displaced liquid from the one chamber into the tube past a check valve allowing such flow. The tube contains a metallic bead which is pushed by the fluid flowing in the tube and thus, the position of the bead along the tube depends on the amount of fluid displaced. The check valve prevents reverse flow of fluid and the bead is held in its maximum displacement position.

For detecting the position of the bead along the tube, the tube interior has a resistive element and a conductive element, each extending axially along the tube and being insulated from each other except by the movable bead. An effective potentiometer is thus formed which, with external connections, energization and detecting means can determine the position of the bead and, therefore, also the acceleration.

To hold the bead firmly against the liquid, the end of the tube remote from the check valve, communicates with a closed chamber containing a gas under sufficient pressure to force the bead along the tube.

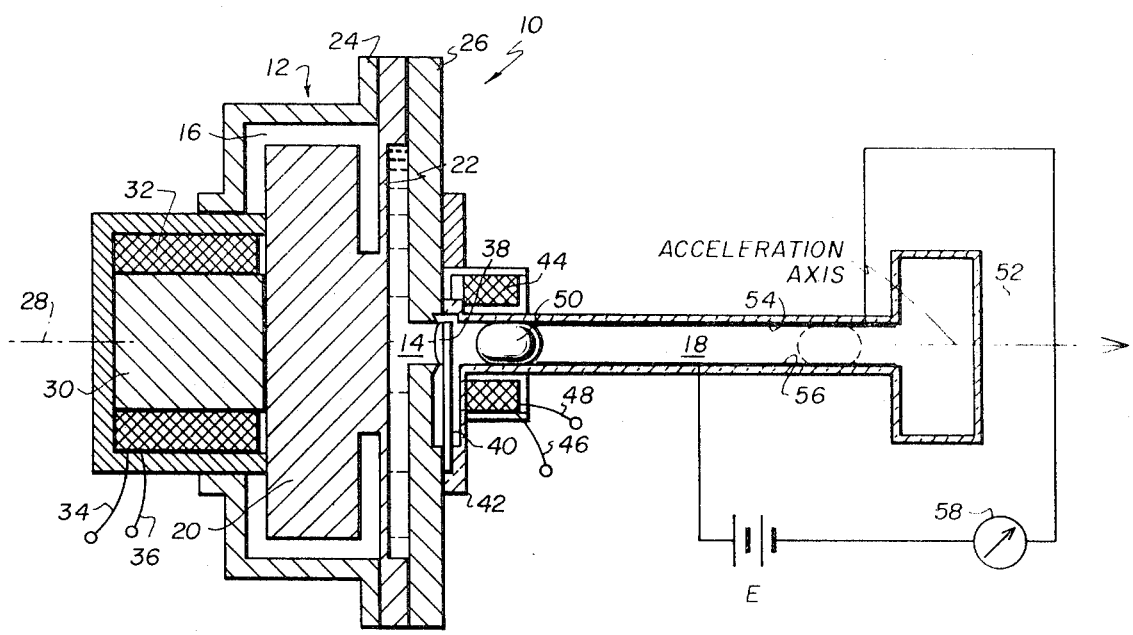

ACCELERATION SENSING APPARATUS

BACKGROUND OF THE INVENTION

This invention relates to inertial apparatus and more particularly to an apparatus for sensing and indicating the maximum acceleration, either positive or negative, to which the apparatus is subjected.

In various endeavors it is desirable or necessary to determine the maximum acceleration of some body. In cases of nondestructive sensing apparatus for determining such accelerations, it is desirable that it have a high degree of repeatability. That is, that the apparatus successively provide the same indications for accelerations of the same magnitude. In many prior art apparatus wherein sliding friction of one element against another is involved, high repeatability is not achieved.

In addition to the foregoing, maximum acceleration sensors, especially because of the aerospace environments wherein they find most frequent application, are preferably of low cost, small size and weight and, of course, of high accuracy, reliability, durability, and compatibility with other existing systems.

In accordance with this invention, these qualities are inherent in a maximum acceleration sensor having a pair of axially juxtaposed chambers, the first of which is filled with an incompressible fluid and in communication with one end of a tube and the second chamber of which contains a proof mass axially movable toward and into the first chamber. Thus, in response to an acceleration, the proof mass moves axially and displaces some of the fluid in the first chamber and forces it into the tube. The tube is provided with axially coextensive resistive and conductive elements along its interior and being insulated from each other except for a conductive bead within the tube. The bead is preferably of liquid metal at the operating temperatures of the apparatus and is maintained in contact with the fluid by the force of a gas contained in a closed chamber communicating with the other end of the tube. Thus, in response to an acceleration forcing the proof mass partially into the fluid containing chamber, some of the fluid is forced from this chamber into the tube and the bead is forced along the tube to some position determined by the magnitude of acceleration and fluid displacement. The interconnection of the resistive and conductive elements in the tube serves as a potentiometer which, with external circuitry, enables a determination of its position along the tube and hence, the acceleration. For determination of maximum acceleration, a check valve is disposed between the fluid filled chamber and the tube to prevent back flow of fluid from the tube and thus, to hold the bead in its maximum displaced position. For a continuous indication of accelerations, the same apparatus without the check valve may be used.

Other objects and many additional advantages will be more readily understood by those skilled in the art after a detailed consideration of the following specification taken with the accompanying drawing.

BRIEF DESCRIPTION OF THE DRAWING

The single FIGURE of drawing illustrates in longitudinal cross section, a maximum acceleration sensor apparatus according to this invention.

DESCRIPTION OF THE PREFERRED EMBODIMENT

Referring now to the drawing for a detailed description of a preferred embodiment of the invention, 10 represents generally the entire maximum acceleration apparatus of this invention which includes as principal components, the enclosure 12 having interior chambers 14 and 16 and an elongated tube 18 communicating with the chamber 14 and being preferably of an insulating material such as ceramic, glass, or the like. The chamber 14 is filled with an electrically nonconducting incompressible fluid of any suitable composition, and the chamber 16 contains a proof mass 20 which is preferably integral or connected to a resilient diaphragm 22. The diaphragm 22 is secured about its outer periphery between housing component members 24 and 26. These members may be secured as by any suitable bonding means or bolts, not shown. The proof mass 20 is free to move along an acceleration axis 28; however, in the absence of an acceleration, it is maintained in the position shown in the FIGURE by the resilient force of the diaphragm 22. The proof mass 20 is also selectively latched in the position shown, by a permanent magnet 30 which attracts the proof mass 20 by reason of its ferromagnetic composition. Alternatively, only a portion of the proof mass 20 adjacent to the permanent magnet 30 may be of ferromagnetic composition whereas the remainder thereof may be of any other suitable composition. For releasing the latching effect of permanent magnet 30, an electrical winding 32 is disposed about the magnet 30 and is provided with electrical leads 34 and 36 which may be energized in the appropriate polarity to produce a magnetic field countering that of the permanent magnet 30 thereby cancelling the attractive effect on the proof mass 20.

As is clear, an acceleration, positive or negative, as the case may be, is effective to displace the proof mass 20 from its position entirely within chamber 16 to a position partially within chamber 14 whereby the resilient diaphragm 22 is deflected; and in this circumstance, a portion of the incompressible fluid contained in chamber 14 is forced into the tube 18. A bellows, not shown, is attached to chamber 16 in order to allow for expansion of fluid caused by changes in temperature. This flow of fluid is free to pass a flap type of check valve 38 covering the opening between chamber 14 and tube 18 and being mounted on a resilient stem 40 secured at its remote end to the enclosure member 26 by a clamping member 42. It is also clear that in the absence of any other influence, the check valve 38 prevents any back flow of fluid from the tube 18 into the chamber 14. However, for selectively permitting such back flow in circumstances such as in resetting of the apparatus, an electrical coil 44 is provided around one end of the tube 18 and has a pair of leads 46 and 48 energizable to produce a magnetic field attracting the flap valve 38 so as to open it and permit the reverse flow of fluid.

The various solid components of the apparatus 10 are assembled and held together by any suitable means, not shown, and not forming an essential part of this invention.

For facilitating sensing and determining of the acceleration applied to the proof mass 20, the interior of tube 18 contains a conductive bead 50, preferably a liquid metal such as mercury-gallium alloy, which tends to assume a spherical shape by reason of its inherent surface tension and which extends entirely across the tube and is in abutment with the fluid received by tube 18 from chamber 14. As is clear, the flow of the fluid from chamber 14 into tube 18 pushes the bead 50 along the tube, in accordance with the displacement of the proof mass 20.

For assuring the firm abutment of the bead 50 with the fluid from the chamber 14, the end of tube 18 remote from the flap valve 38 is in communication with a closed gas chamber 52; and this chamber is filled with a suitable gas under sufficient pressure to force the bead 50 into such abutment.

For detecting the position of bead 50 along the tube, the interior of the tube 18 is provided with an axially extending, resistive element 54 and a coextensive, axially extending, conductive element 56 which are separated from each other and therefore insulated from each other with the exception of the contact made between these two elements by the bead 50.

An external circuit, including an electrical potential source designated E, and a meter or other indicating apparatus 58 are connected in series between the conductor 56 and one end of resistive element 54. Thus, as the bead 50 is positioned along the tube 18, the resistance interposed in this external circuit is varied whereby an indication of its position along the tube is facilitated.

From the foregoing description, it is clear therefore that the apparatus 10 is responsive to an acceleration displacing the proof mass 20 partially into the chamber 14, to force the incompressible fluid contained in this chamber past the check valve 38 and, therefore, also to force the bead 50 to a position along the tube 18. Following the maximum acceleration applied to the proof mass 20, the flap valve 38 closes to retain bead 50 in its displaced position, the bead at all times being maintained at its position nearest the flap valve by the pressure of gas in the chamber 52. The external circuit, including the potential source E, and meter 58 provide an electrical indication of the position of the bead 50 along the tube 18 and thus, also provide an indication of the maximum acceleration force applied to the proof mass 20.

It is, of course, clear that an apparatus as described hereinabove, except with the omission of the check valve 38, would be effective for providing continuous indications of acceleration rather than merely an indication of maximum acceleration. Also, a back-to-back arrangement of two acceleration apparatus 10, wherein one is responsive to accelerations in one direction and the other is responsive to accelerations in the opposite direction may be provided, thus, to indicate in effect both positive and negative accelerations; that is, both acceleration and deceleration.

In accordance with the foregoing description, it is apparent that the apparatus 10 is free of any sliding friction whereby high repeatability is an inherent characteristic of the apparatus; and it is also clear that the fluid damping of the apparatus provides vibration shock resistance, that the electrical contacts made by the metallic bead 50 are of low contact resistance and low noise with freedom from bounce under vibration and that in general the apparatus is of great simplicity and consequent high reliability, low costs, small size, and it is compatible with existing electrical systems.

While the present invention has been described in a preferred embodiment, it will be obvious to those skilled in the art that various modifications can be made therein within the scope of the invention and it is intended that the appended claims cover all such modifications.

We claim:

1. An apparatus having an axis and comprising an enclosure with a pair of axially adjacent chambers and an elongated tube in communication with one of said chambers, a substantially incompressible fluid filling said one chamber, a proof mass disposed in the other of said chambers and being movable along said axis to project into said one chamber to displace fluid therein and force the same into said tube, a member in said tube in contact with said fluid and being movable along said tube by the movement of fluid therealong, means for detecting the location of said member along said tube, and a check valve between said one chamber and said tube for freely admitting fluid from said one chamber into said tube and blocking a reverse flow.

2. An apparatus according to claim 1 additionally comprising a deformable diaphragm attached to said proof mass and separating said chambers.

3. An apparatus according to claim 2 wherein said diaphragm possesses resilient qualities tending to maintain said proof mass in a predetermined null position and resisting axial displacement of the proof mass from said null.

4. An apparatus according to claim 3 additionally comprising means for selectively attracting said proof mass toward and holding it in said null position.

5. An apparatus according to claim 1 additionally comprising a resistive element and a conductive element insulated from each other and each extending axially along the interior of said tube and wherein said member is conductive and interconnects said resistive and conductive elements at its axial positions along said tube.

6. An apparatus according to claim 5 wherein said member comprises a liquid metallic bead.

7. An apparatus according to claim 1 additionally comprising means for selectively latching said proof mass with respect to its enclosure, a check valve disposed between said one chamber and said tube to prevent flow of said fluid from said tube to said one chamber, and means for selectively opening said check valve to admit fluid from said tube to said one chamber.

8. An apparatus according to claim 6 additionally comprising a closed gas chamber in communication with the end of said tube remote from the end thereof in communication with said one chamber and gas filling said gas chamber and the portion of said tube between said gas chamber and said bead to apply a force to said bead tending to maintain the same in contact with said fluid in said tube.

9. An apparatus having an axis and comprising an enclosure with a pair of axially adjacent chambers and an elongated tube in communication with one of said chambers, a substantially incompressible fluid filling said one chamber, a proof mass disposed in the other of said chambers and being movable along said axis to project into said one chamber to displace fluid therein and force the same into said tube, a member in said tube in contact with said fluid and being movable along said tube by the movement of fluid therealong and means for detecting the location of said member along said tube, said apparatus additionally comprising a resistive element and a conductive element insulated from each other and each extending axially along the interior of said tube and wherein said member is conductive and interconnects said resistive and conductive elements at its axial positions along said tube.

10. An apparatus according to claim 9 wherein said member comprises a liquid metallic bead.

11. An apparatus according to claim 10 additionally comprising a closed gas chamber in communication with the end of said tube remote from the end thereof in communication with said one chamber and gas filling said gas chamber and the portion of said tube between said gas chamber and said bead to apply a force to said bead tending to maintain the same in contact with said fluid in said tube.